April 6, 1965   J. W. CAMERON   3,177,150
TREATMENT GAS AND SYSTEM FOR ITS GENERATION
Filed Oct. 9, 1959   2 Sheets-Sheet 1

INVENTOR.
JACK W. CAMERON
BY Flehr & Swain
ATTORNEYS

INVENTOR.
JACK W. CAMERON
BY
Flehr & Swain
ATTORNEYS

United States Patent Office 3,177,150
Patented Apr. 6, 1965

3,177,150
TREATMENT GAS AND SYSTEM FOR ITS
GENERATION
Jack William Cameron, West Covina, Calif., assignor to
Vitagen Corporation, Los Angeles, Calif., a corporation
of Nevada
Filed Oct. 9, 1959, Ser. No. 845,537
2 Claims. (Cl. 252—373)

This invention relates to improved treatment gases suitable for the treatment of various organic materials, including food products, and to methods and apparatus for the generation of such gases.

In Dunkley Patent 2,490,951 there is disclosed and claimed an effective process for the treatment and preservation of various food products. It employs a special treatment gas obtained by an incomplete burning of natural gas or like hydrocarbon fuel. When prepared from natural fuel gas, according to the procedure described in the patent, the gas includes nitrogen, carbon dioxide, hydrogen and acetylene together with small amounts of highly active gaseous products produced by the interaction of carbon dioxide, carbon monoxide and unsaturated hydrocarbons in the presence of water vapor. When food products or other organic materials are contacted with the Dunkley gas, spoiling due to enzymatic activity is inhibited. The gas also acts to prevent oxidation by atmospheric oxygen, apparently through combination of the highly active gaseous products (hereinafter termed unsaturates) with any free oxygen present.

While the special gas of Patent 2,490,951 is highly effective in a wide variety of commercial food preservation processes, it is nevertheless subject to certain objections, due principally to the presence of acetylene and the highly active unsaturates mentioned above. Some of these gaseous products not only are mildly toxic but are suspected of contributing to various side reactions capable of producing carcinogenic or other toxic effects. Serious questions have consequently been raised as to whether the gas is safe for all food processing procedures for which it has been proposed.

In general, it is an object of the present invention to provide an improved treatment gas which is at least as effective in the treatment of food products and other organic materials as the special gas of Dunkley Patent 2,490,-951, yet which is free of acetylene and other unsaturated residual or polymerized hydrocarbons.

Another object of the invention is to provide a gas generating method and apparatus capable of producing the improved treatment gas, with a high degree of reliability and consistency with respect to desired proprotions of ingredients and elimination of undesired hydrocarbons.

Another object of the invention is to provide a method and apparatus of the above character by which critical operating conditions to produce the desired gas can be consistently obtained.

Additional objects and features of the invention will appear from the following description in which the preferred embodiment has been set forth in detail in conjunction with the accompanying drawing.

Referring to the drawing.

In generating the gas desired for the Dunkley process, it has been the practice to combust a fuel gas with an amount of air less than that required for complete combustion, and at combustion temperatures considerably in excess of 1000° F. As typified in Jacobs Patent 2,772,952, combustion is initiated in an inner chamber to achieve initial temperatures within the range of 1600° to 1800° F. Thereafter, as the flame mass expands into contact with the refractory lining of the combustion chamber, temperatures of the order of 1800° to 2300° F. are commonly obtained. At these elevated temperatures, the refractory material apparently exerts a catalytic effect tending to promote completion of the combustion reaction. However, due to direct water cooling of the combustion chamber, the refractory is characterized by "hot" and "cool" spots which effect an uneven or heterogeneous type of combustion. Stated in another way, there is insufficient refractory surface at a uniform elevated temperature to allow complete combustion, with the result that a degree of reversible combustion inevitably occurs to produce acetylene and small amounts of highly active gaseous unsaturates which constitute the desired active components of the Dunkley gas. Although the amount of these active components may amount to no more than 0.1 to 0.7% of the total gases present, they are essential to the effectiveness of the Dunkley gas.

In general, the present invention is predicated upon my discovery of procedures by which combustion can be obtained in a relatively narrow range of refractory temperatures, between about 1250° and 1700° F. It is believed that by maintaining substantially all of the refractory within this narrow range, complete combustion is not only obtained but at temperatures sufficiently low to permit a rapid quench through the reversible combustion range. As a result, it is possible to obtain an improved treatment gas which is free of acetylene, unsaturates, or other hydrocarbons, and which contains an unusualy high proportion of ingredients characterized by reducing properties (principally carbon monoxide and hydrogen).

In accordance with the improved procedure disclosed herein, the combustion reactions in the retort are substantially arrested by circulating the gaseous products of combustion into an annular chilling zone surrounding the refractory material forming the combustion zone. In this chilling zone, the product gases are contacted by a cooling medium which acts through such gases to cool the refractory material, and consequently the gases in the combustion zone. Preferably countercurrent heat exchange is employed in each instance, that is, between the chilled product gases and the gases undergoing combustion, and between such product gases and the cooling medium.

Figure 1:
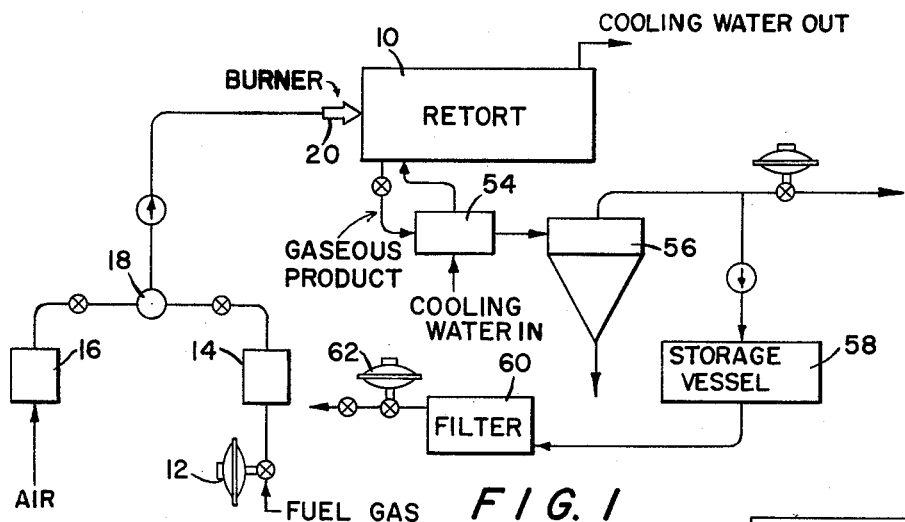
FIGURE 1 is a schematic view illustrating equipment used in the generation of the improved treatment gas.

Referring to the drawings, my improved treatment gas can be produced by controlled burning of a fuel gas, such as natural gas, in apparatus of the type illustrated in FIGURE 1. This apparatus consists generally of a retort 10 to which the fuel gas can be supplied through the pressure reducing regulator 12 and flow metering device 14. Combustion supporting air can similarly be supplied through the metering device 16. The fuel gas and air are combined in the mixer 18 and from thence pumped to the burner 20. In general, as in the Dunkley process, the amount of combustion supporting air or oxygen supplied to the burners is insufficient for complete combustion of the fuel gas.

Figure 2:
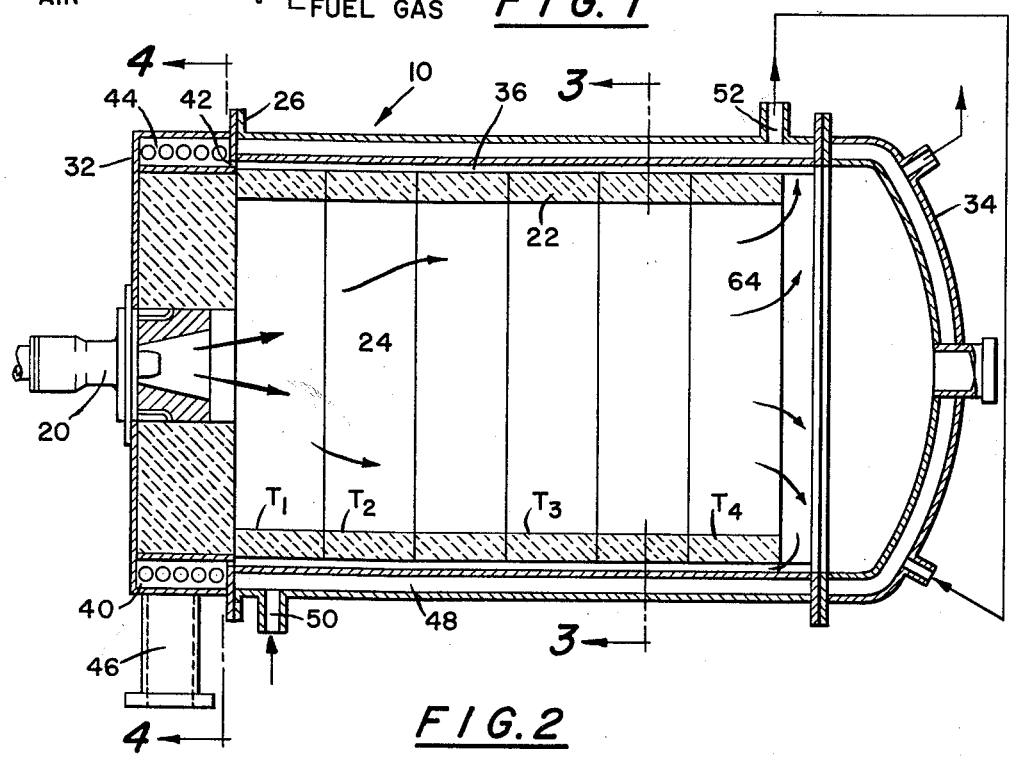
FIGURE 2 is a view in vertical section illustrating a preferred combustion chamber for use in the gas generating apparatus.

The retort 10 is provided with a combustion chamber substantially formed by refractory material 22, which may be any iron-free castable material having a fusion point in excess of about 3000° F. (e.g., sillimanite, silica brick, high-alumina clay brick, etc.). As illustrated, the refractory material forms a generally cylindrical combustion chamber 24, closed at the inlet end and open at the opposite end. The refractory material is supported by an outer shell or casing 26 which includes inner an outer wall means 28 and 30 concentrically arranged about the combustion chamber, and double-walled end portions 32 and 34 (FIGURE 2). The end portion 32 supports the inlet fuel burner 20 and surrounding refractory material, which together form one end wall of the combustion chamber. The opposite end 34 of the shell forms an enclosure for the combustion chamber, and serves to direct the gaseous products of combustion into an annular chilling zone 36 between the refractory material and the inner wall 28, as will appear.

Figure 3:
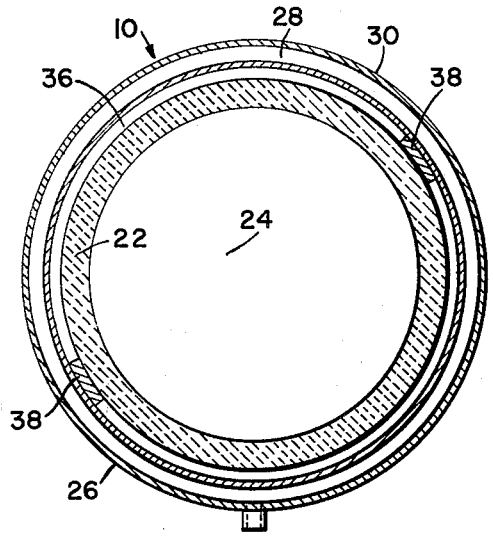
FIGURE 3 is a view in section along the line 3—3 of FIGURE 2.
Figure 4:
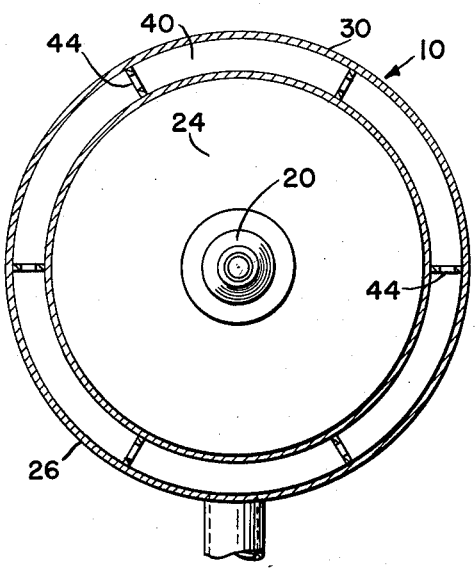
FIGURE 4 is a like view along the line 4—4 of FIGURE 2.
Figure 5:
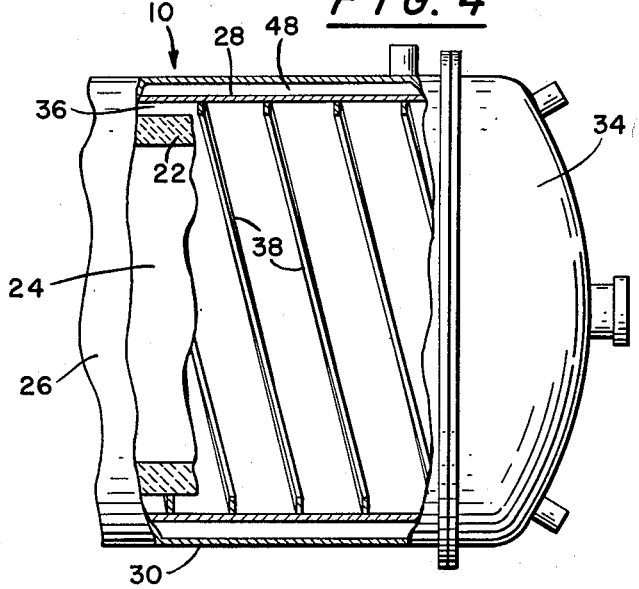
FIGURE 5 is a fragmentary view in elevation illustrating details of the invention.

Referring to FIGURES 3 and 5, the inner wall 28 is shown supported at a spaced distance from the refractory liner 22 by baffle means 38, which preferably is a single baffle of helical configuration. As an alternative, a series of baffles arranged parallel to the axis of the combustion chamber can be employed. The function of the baffle means 38 is to direct the products of combustion from the combustion chamber 24 into a tortuous path immediately adjacent and surrounding the combustion chamber, and countercurrent to the movement of the gases through the combustion chamber. From the chilling zone 36, cool gas is delivered to an outlet passage 40 in the opposite end of the retort, through the ports 42. If desired, apertured baffles 44 may be provided in the outlet passage to prevent undesired turbulence. The desired gaseous product is finally discharged from the retort through an outlet port 46.

As shown in FIGURE 2, the gaseous product flowing in the annular path 36 is continually chilled by a flow of cooling medium (which in a typical case is water) through the jacket 48. Preferably the piping to the inlet 50 and outlet 52 is such that the flow of cooling water is countercurrent to the flow of gas in the zone 36, providing maximum cooling at an end of the combustion chamber closest to the burner. The cooling medium may be additionally circulated through the end 34 of the retort, as indicated in FIGURE 2. As noted hereafter, (e.g., Example 2) cooling in this fashion insures a remarkable uniformity of combustion temperatures within the combustion chamber 24, and consequently production of a treatment gas having the desired characteristics.

From the retort, the product gas is shown being delivered to a secondary cooler 54 (FIGURE 1), which in a typical instance can consist of water jacketed heat exchange tubes through which the gas passes. The cool gas from 54 is passed through a water separator 56, to remove entrained water droplets, and then is in condition for use. It may be pumped to a storage vessel 58 (optional), and from thence delivered to the filter 60 and pressure reducing regulator 62 for introduction into a space or chamber containing the food product or other organic material to be treated.

In generating the improved treatment gas with the apparatus described, the ratio of combustion supporting air to fuel gas in the supply to the burner is preferably between about 8.5:1 to 9.5:1, corresponding to about 85% to 95% of the amount of air required for complete combustion. In normal operation, the intermixed air and fuel gas is supplied to the burner, and jetted into the combustion chamber 24 where the flame mass contacts the refractory liner 22. In an ordinary gas generator, such as employed to produce the Dunkley gas, a wide variation in refractory temperatures occurs (e.g., in a typical instance from a low of 100° F. to a high of 2300° F.) as a consequence of contact of the flame mass with the directly cooled refractory. In accordance with the present invention, the gases undergoing combustion are immediately and continually cooled in the chamber 24 by contact with the refractory lining 22, substantially all of which is maintained within a critical range between about 1250° and 1700° F. The generated gases are thereafter cooled in the annular chilling zone surrounding this chamber by direct contact with the water jacket 48.

Referring specifically to FIGURE 2, my observations have indicated that the cooling water circulating through the inlet 50 effects an immediate substantial cooling of the gas in the combustion chamber at a point adjacent the burner 20. This substantial cooling is possible due to the fact that the gases at this point in the path 36 have already been substantially cooled and consequently effect considerable heat exchange to the refractory liner. In an intermediate zone of the combustion chamber, where excessive temperatures would normally be encountered, there is a levelling of the temperatures of combustion, followed by an actual temperature drop in the remote portions of the combustion chamber. By way of illustration, a gradual rise in temperature from about 1300° to 1600° F. or slightly higher may be observed, up to a point approximately two-thirds of the distance from the burner, whereas a decline in temperature to about 1400° to 1500° F. or less may be observed up to the point of entry of the gases into the annular chilling zone 36 (arrow 64 in FIGURE 2). Thereafter the gaseous combustion products moving in the zone 36 are gradually cooled by contact with the cooling medium flowing in the jacket 48, to an outlet temperature between about 150° to 200° F. The gradual movement of the gases through the zone 36 insures a desired transfer of heat from the refractory liner.

Cooling of the gases in the manner described is of critical importance to the successful production of the desired treatment gases, since it makes possible the combustion of the fuel gas introduced to the retort within the indicated critical temperature range between about 1250° F. and 1700° F. Within this temperature range, the combustion reaction is arrested at a point of complete combustion of the hydrocarbons present in the fuel gas, to produce an unexpected increase in the proportion of non-hydrocarbon combustibles (specifically carbon monoxide and hydrogen). In general, these combustibles comprise about 5% to 9% of the gaseous products produced (minimum 2%) and impart substantial reducing characteristics to the generated gas without actually rendering the gas combustible. The remainder of the gas comprises inert gases ($CO_2$, $N_2$ and argon) as indicated in the typical example presented below. Acetylene and other hydrocarbons cannot be detected upon analysis and exist, if at all, in infinitesimal amounts (e.g., less than 0.000005%).

In general, controlled combustion as described above will produce a desired gaseous product having an approximate analysis as follows:

| | Mole percent |
|---|---|
| Hydrogen | 2.0 to 4.2 |
| Carbon monoxide | 1.9 to 4.1 |
| Carbon dioxide | 8.0 to 11.0 |
| Nitrogen and argon | 82.9 to 86.5 |
| Oxygen | 0.0 to 0.05 |
| Hydrocarbons. | |
| Acetylene. | |

Specific examples of the practice of the invention are as follows:

EXAMPLE 1

Intermixed air and fuel gas was supplied to gas generating apparatus substantially as illustrated in the drawings, at an average hourly rate of 1400 cubic feet of air and 145 cubic feet of fuel gas. The fuel gas, comprising 75% natural gas from mid-continent sources and 25% from California sources, provided an average analysis as follows:

| | Mole percent |
|---|---|
| Methane | 83.8 |
| Ethane | 8.0 |
| Propane | 3.4 |
| Butane | 0.4 |
| Pentane | 0.1 |
| Carbon dioxide | 0.3 |
| Oxygen | 0.0 |

During the processing, cooling water having an inlet temperature of 75° F. was supplied to the secondary cooler at a continuous rate of 2200 pounds per hour and left at a temperature of 80° F. The generated gas leaving the generator was at a temperature of about 175° F., and the gas leaving the secondary cooler at a temperature of approximately 83° F. The temperature of the cooling water discharged from the system was 132° F. Analysis of a number of samples of the generated gas are presented in the Table I.

*Table I*

|  | Mole Percent | | |
| --- | --- | --- | --- |
|  | 1 | 2 | 3 |
| Hydrogen | 2.7 | 2.70 | 2.89 |
| Carbon monoxide | 2.4 | 2.38 | 3.10 |
| Carbon dioxide | 10.0 | 9.98 | 9.79 |
| Nitrogen and argon | 84.9 | 84.89 | 83.99 |
| Oxygen | 0.0 | 0.05 | 0.03 |
| Hydrocarbons |  |  |  |
| Acetylene |  |  |  |

EXAMPLE 2

During processing, as in Example 1, temperature readings were obtained by means of thermocouples attached to the refractory lining at the points designated $T_1$, $T_2$, $T_3$, and $T_4$ in FIGURE 1 of the drawing. Average readings obtained are set forth in Table II:

*Table II*

| | Temperature, ° F. |
| --- | --- |
| $T_1$ | 1350 |
| $T_2$ | 1520 |
| $T_3$ | 1600 |
| $T_4$ | 1475 |

The results demonstrate the remarkably uniform combustion temperatures capable of being obtained within a combustion zone cooled in accordance with the invention.

EXAMPLE 3

Employing isooctane (2,2,4, trimethyl pentane) as a solvent, a series of test samples were prepared for use in a Perkins-Elmer Model 21 double beam infrared spectrophotometer. In each case, 7500 milliliters of a product gas analyzing substantially as in Column 1 of Table I was bubbled through 75 mm. of the solvent. Additional test samples were prepared, in similar fashion, but employing such gas which previously had been filtered. Sodium chloride cells with an 0.017 inch liquid space were used as the test cells. Similar cells containing isooctane through which no gas had been bubbled were placed in the reference beam of the spectrophotometer. The spectrum of each gas-treated sample of solvent was scanned from 2.0 to 16.0 microns. All samples were prepared and tested in duplicate.

The tests were repeated using carbon tetrachloride as solvent. In every case the spectra showed an absorption peak at 4.30 microns, evidently caused by absorption of carbon dioxide in the solvent. No spectra showing absorption typical of hydrocarbons were observed. These results indicate that no detectable hydrocarbons were present in any of the samples of product gas tested.

EXAMPLE 4

Employing the general procedure of Example 3, ultraviolet spectra were prepared with a Beckman Model DL-2 spectrophotometer. The isooctane samples were scanned from 315 to 211 millimicrons, the carbon tetrachloride samples from 360 to 270 millimicrons. No discernible difference was observed between the spectra of the blanks and the solvents through which the product gases had been bubbled, again indicating freedom from detectable hydrocarbons.

Although the effectiveness of my new gas may result from additional factors, it is predicated upon a unique combination of properties: it is nontoxic and incapable of side reactions to produce toxic effects; and it is useful both as an inert isolator against oxidation (due to the presence of carbon dioxide, nitrogen and argon) and as a reducing atmosphere (due to the increased hydrogen and carbon monoxide content). As previously indicated, a typical gas will contain in excess of 5% of intermixed carbon monoxide and hydrogen. As these gases can selectively combine with approximately half their volume of free oxygen, they provide a high degree of protection to treated food products. In addition the gas functions to effectively inhibit biocatalysts associated with enzymatic activity.

In carrying out the present invention, many variations are possible. By way of illustration, fuel gases other than natural gas can be successfully employed. Specifically, it is possible to use liquified petroleum products, such as propane and butane, or their mixtures, in amounts providing Btu. values proportional to that of natural gas (e.g., a factor of 2.5 for propane, and 3.2 for butane).

As a further variation, the proportions of fuel gas and combustion supporting air supplied to the burner can be automatically regulated by analysis of the generated gases in the discharge line. For example, apparatus is disclosed in my copending application, Serial No. 811,370, filed May 6, 1959, and now abandoned, by which the proportion of carbon monoxide and hydrogen being produced can be used to regulate input. As applied to the present invention, the generation of gas can be controlled so that only gas within the desired range of proportions (say 2% to 9% of $H_2$ and CO) is allowed to pass to food processing equipment. By controlling the system to the midpoint of the indicated range, allowance can be had for minor fluctations in fuel and air supply, without interference with overall processing procedures.

I claim:

1. A process for preparing a gaseous composition for the treatment of food products, comprising intermixing a hydrocarbon fuel was selected from the group consisting of natural gas, propane and butane and mixtures thereof, with from 85% to 95% of the amount of air required for complete combustion of said fuel gas, burning said fuel gas in a combustion zone at a temperature between about 1250° F. and 1700° F. in contact with the inner surface of a surrounding refractory material, said fuel gas being retained in said combustion zone until the gaseous product of combustion is free of hydrocarbons, cooling said hydrocarbon-free gaseous product outside of said combustion zone with a cooling medium and contacting the outer surface of said refractory material with said cooled hydrocarbon-free gaseous product whereby substantially the entire inner surface of said refractory is maintained at a temperature between about 1250° F. and 1700° F. during burning of said fuel gas.

2. A process for preparing a gaseous composition for the treatment of food products, comprising intermixing a hydrocarbon fuel gas consisting of natural gas, the major proportion of which is methane, with from 85 to 95% of the amount of air required for complete combustion of said fuel gas, burning said fuel gas in a combustion zone at a temperature between about 1250° F. and 1700° F. in contact with the inner surface of a surrounding refractory material, said fuel gas being retained in said combustion zone until the gaseous product of combustion is free of hydrocarbons, cooling said hydrocarbon-free gaseous product outside of said combustion zone with a cooling medium and contacting the outer surface of said refractory material with said cooled hydrocarbon-free gaseous product whereby substantially the entire inner surface of said refractory is maintained at a temperature between about 1250° F. and 1700° F. during burning of said fuel gas.

(References on following page)

References Cited by the Examiner

UNITED STATES PATENTS

| | | | |
|---|---|---|---|
| 1,918,254 | 7/33 | Faber | 252—373 |
| 1,923,614 | 8/33 | Clarkson | 158—45.5 |
| 2,214,926 | 9/40 | Guthrie et al. | 252—373 |
| 2,383,715 | 8/45 | Jahn | 252—373 |
| 2,478,732 | 8/49 | Wilson et al. | 126—360 |
| 2,490,951 | 12/49 | Dunkley | 252—373 XR |
| 2,729,546 | 1/56 | Williamson | 23—281 |
| 2,772,952 | 12/56 | Jacobs | 23—281 |
| 2,897,158 | 7/59 | Sanzenbacher et al. | 252—372 |

OTHER REFERENCES

"Westinghouse Heat-Treating Atmospheres," publ. by Westinghouse Electric and Manufacturing Co., received in the Pat. Off. Mar. 10, 1944, p. 6.

LEON ZITVER, *Primary Examiner.*

JOSEPH R. LIBERMAN, JERALD GREENWALD,
*Examiners.*